United States Patent
Boutros et al.

(10) Patent No.: US 11,496,354 B2
(45) Date of Patent: Nov. 8, 2022

(54) ECMP FAST CONVERGENCE ON PATH FAILURE USING OBJECTS IN A SWITCHING CIRCUIT

(71) Applicant: Ciena Corporation, Hanover, MD (US)

(72) Inventors: Sami Boutros, Union City, CA (US); Kambiz Frounchi, Ottawa (CA); Tao Wang, Ottawa (CA)

(73) Assignee: Ciena Corporation, Hanover, MD (US)

( * ) Notice: Subject to any disclaimer, the term of this patent is extended or adjusted under 35 U.S.C. 154(b) by 60 days.

(21) Appl. No.: 16/902,375

(22) Filed: Jun. 16, 2020

(65) Prior Publication Data
US 2021/0392034 A1    Dec. 16, 2021

(51) Int. Cl.
*H04L 41/0654*    (2022.01)
*H04L 45/24*    (2022.01)

(52) U.S. Cl.
CPC .......... *H04L 41/0654* (2013.01); *H04L 45/24* (2013.01)

(58) Field of Classification Search
CPC ........................... H04L 41/0654; H04L 45/24
USPC ......................................................... 370/228
See application file for complete search history.

(56) References Cited

U.S. PATENT DOCUMENTS

| | | | |
|---|---|---|---|
| 8,295,278 B2 | 10/2012 | Shah et al. | |
| 8,948,055 B2 | 2/2015 | Bragg | |
| 9,444,756 B2 | 9/2016 | Okner et al. | |
| 9,531,627 B1 | 12/2016 | Alvarez et al. | |
| 9,538,423 B2 | 1/2017 | Alvarez et al. | |
| 9,853,900 B1* | 12/2017 | Mula ................... | H04L 45/7453 |
| 9,979,629 B2 | 5/2018 | Sivabalan et al. | |
| 10,069,639 B2 | 9/2018 | Bragg et al. | |
| 10,153,948 B2 | 12/2018 | Ong | |
| 10,250,494 B2 | 4/2019 | Sivabalan et al. | |
| 2008/0219277 A1* | 9/2008 | Pratap ................. | H04L 41/5054 370/406 |
| 2010/0290458 A1* | 11/2010 | Assarpour ............... | H04L 45/00 370/389 |
| 2011/0249679 A1* | 10/2011 | Lin ......................... | H04L 45/50 370/400 |
| 2012/0044800 A1* | 2/2012 | Coltro .................... | H04L 45/22 370/217 |

(Continued)

OTHER PUBLICATIONS

C. Filsfils et al., Spring Internet-Draft, Standards Track, Expires: Aug. 28, 2020, Network Programming extension SRv6 uSID instruction draft-filsfils-spring-net-pgm-extension-srv6-usid-04, Feb. 25, 2020, pp. 1-14.

(Continued)

*Primary Examiner* — Meng Vang
(74) *Attorney, Agent, or Firm* — Clements Bernard Baratta; Lawrence A. Baratta, Jr.; Christopher L. Bernard

(57) ABSTRACT

A switching circuit includes circuitry configured to manage a plurality of Equal Cost Multiple Paths (ECMPs) through a plurality of shared protection group objects, wherein each of the plurality of shared protection group objects is connected to two paths in the ECMPs, and wherein a number of shared protection group objects equals a number of next-hops, cause distribution of packets based on a setting of the shared protection group object for each next-hop, and responsive to a failure of a next-hop, change the setting of the shared protection group object for the failed next-hop.

20 Claims, 9 Drawing Sheets

(56) References Cited

U.S. PATENT DOCUMENTS

| | | | | |
|---|---|---|---|---|
| 2012/0170585 A1* | 7/2012 | Mehra | ............... | H04L 45/24 |
| | | | | 370/400 |
| 2013/0051250 A1* | 2/2013 | Shaffer | ............. | H04L 43/08 |
| | | | | 370/252 |
| 2014/0211641 A1* | 7/2014 | Gohite | ............... | H04L 45/66 |
| | | | | 370/252 |
| 2014/0293786 A1* | 10/2014 | Lin | ................ | H04L 47/17 |
| | | | | 370/235 |
| 2015/0288602 A1 | 10/2015 | Bragg et al. | | |
| 2016/0380886 A1 | 12/2016 | Blair et al. | | |
| 2019/0028577 A1* | 1/2019 | D?Souza | ............ | H04L 45/22 |
| 2019/0132221 A1 | 5/2019 | Boutros et al. | | |
| 2019/0245787 A1 | 8/2019 | Skalecki et al. | | |

OTHER PUBLICATIONS

C. Filsfils et al., Spring Internet-Draft, Standards Track, Expires: Aug. 26, 2020, SRv6 Network Programming draft-ietf-spring-srv6-network-programming-10, Feb. 23, 2020, pp. 1-38.

A. Sajassi et al., Internet Engineering Task Force (IETF), Category: Informational, ISSN: 2070-1721, Requirements for Ethernet VPN (EVPN), May 2014, pp. 1-15.

A. Sajassi et al., Internet Engineering Task Force (IETF), Category: Standards Track, ISSN: 2070-1721, A Network Virtualization Overlay Solution Using Ethernet VPN (EVPN), Mar. 2018, pp. 1-33.

J. Rabadan et al., Internet Engineering Task Force (IETF), Category: Standards Track, ISSN: 2070-1721, Framework for Ethernet VPN Designated Forwarder Election Extensibility, Apr. 2019, pp. 1-32.

* cited by examiner

ECMP FAST CONVERGENCE ON PATH FAILURE USING OBJECTS IN A SWITCHING CIRCUIT

FIELD OF THE DISCLOSURE

The present disclosure generally relates to networking. More particularly, the present disclosure relates to systems and methods for Equal Cost Multiple Path (ECMP) fast convergence on next-hop path failures using objects in a switching circuit.

BACKGROUND OF THE DISCLOSURE

Ethernet Virtual Private Network (EVPN) technology is replacing the legacy Pseudowire (PW) technology for Layer 2 (L2)-Virtual Private Local area network Service (VPLS) and Virtual Private Wire Service (VPWS). EVPN supports Active/Active (A/A) redundancy and Active/Standby (A/S) redundancy and defines Border Gateway Protocol (BGP) EVPN routes to achieve fast convergence on link or node failures. Route Type-1 in EVPN is used by a BGP Provider Edge (PE) to inform the remote PE about a local Ethernet segment failure. With existing implementations, all ECMP paths associated with a next-hop link are walked and removed, leading to long convergence times. As described herein, a next-hop link (or just next-hop) is the next destination for a packet to be forwarded. For example, assume one thousand Attachment Circuits (ACs) with one thousand ECMP(s), it is required to walk all 1000 ECMP objects (in hardware, software, firmware, etc.) and delete the next-hop path associated with a down next-hop link. Of course, this process leads to long convergence times when handling many ECMP objects. An AC is a physical or logical circuit between two nodes, such as a Provider Edge (PE) and Customer Edge (CE). Specifically, ECMP is a routing strategy where next-hop packet forwarding to a single destination can occur over multiple "best paths" which tie for top place in routing metric calculations. Also, as described herein, the term ECMP may be used to both refer to the routing approach and to describe multiple paths for a specific route.

BRIEF SUMMARY OF THE DISCLOSURE

The present disclosure relates to systems and methods for Equal Cost Multiple Path (ECMP) fast convergence on next-hop path failures using objects in a switching circuit. Specifically, the present disclosure achieves fast convergence of ECMPs with Active/Active (A/A) redundancy in a switching circuit. The present disclosure utilizes a shared protection group object in hardware that is part of the forwarding chain. That is, with the introduction of the shared protection group in the forwarding chain as a level of indirection allowing all forwarding paths from the same next-hop to point to it, it is possible to, with one update to this object, switch all paths to a backup path if the next-hop goes down. The objective of the present disclosure is the fast convergence when one of the ECMP paths (i.e., a next-hop) goes down. This is accomplished using ECMP, followed by a binary Active/Standby (A/S) protection.

In an embodiment, a switching circuit includes circuitry configured to manage a plurality of Equal Cost Multiple Paths (ECMPs) through a plurality of shared protection group objects, wherein each of the plurality of shared protection group objects is connected to two paths in the ECMPs, and wherein a number of shared protection group objects equals a number of next-hops, cause distribution of packets based on a setting of the shared protection group object for each next-hop, and, responsive to a failure of a next-hop, change the setting of the shared protection group object for the failed next-hop. A number of the plurality of ECMPs is double a number of actual paths, and where the shared protection group object for each next-hop is used for designating one path as active and one path as standby such that the distributing is to the number of actual paths. Convergence for the failed next-hop can be based on a pre-selected backup next-hop based on the shared protection group object for the failed next-hop.

The packets can be distributed in an Active/Active configuration from a Provider Edge (PE) to a Dual Home Device. The packets can be distributed in via Virtual Private Wire Service (VPWS) local switching where one of the ECMPs is reachable via a local port. The packets can be distributed in a Virtual Private Wire Service (VPWS). The packets can be distributed in a Virtual Private Local area network Service (VPLS). The packets can be distributed in Virtual Private Network (VPN) tunnels at Layer 3. For a specific shared protection group object, a plurality of different services can utilize the specific shared protection group object for associated next-hops.

In another embodiment, a method includes managing a plurality of Equal Cost Multiple Paths (ECMPs) through a plurality of shared protection group objects, wherein each of the plurality of shared protection group objects is connected to two paths in the ECMPs, and wherein a number of shared protection group objects equals a number of next-hops; distributing packets based on a setting of the shared protection group object for each next-hop; and, responsive to a failure of a next-hop, changing the setting of the shared protection group object for the failed next-hop. A number of the plurality of ECMPs is double a number of actual paths, and where the shared protection group object for each next-hop is used for designating one path as active and one path as standby such that the distributing is to the number of actual paths. Convergence for the failed next-hop can be based on a pre-selected backup next-hop based on the shared protection group object for the failed next-hop.

The packets can be distributed in an Active/Active configuration from a Provider Edge (PE) to a Dual Home Device. The packets can be distributed in via Virtual Private Wire Service (VPWS) local switching where one of the ECMPs is reachable via a local port. The packets can be distributed in a Virtual Private Wire Service (VPWS). The packets can be distributed in a Virtual Private Local area network Service (VPLS). The packets can be distributed in Virtual Private Network (VPN) tunnels at Layer 3.

In a further embodiment, a non-transitory computer-readable medium includes instructions stored thereon for programming a device to perform the steps of managing a plurality of Equal Cost Multiple Paths (ECMPs) through a plurality of shared protection group objects, wherein each of the plurality of shared protection group objects is connected to two paths in the ECMPs, and wherein a number of shared protection group objects equals a number of next-hops; distributing packets based on a setting of the shared protection group object for each next-hop; and, responsive to a failure of a next-hop, changing the setting of the shared protection group object for the failed next-hop.

A number of the plurality of ECMPs is double a number of actual paths, and where the shared protection group object for each next-hop is used for designating one path as active and one path as standby such that the distributing is to the number of actual paths. Convergence for the failed next-hop is based on a pre-selected backup next-hop based on the shared protection group object for the failed next-hop.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for Equal Cost Multiple Path (ECMP) fast convergence on next-hop path failures using objects in a switching circuit. Specifically, the present disclosure achieves fast convergence of ECMPs with Active/Active (A/A) redundancy in a switching circuit. The present disclosure utilizes a shared protection group object in hardware that is part of the forwarding chain. That is, with the introduction of the shared protection group in the forwarding chain as a level of indirection allowing all forwarding paths from the same next-hop to point to it, it is possible to, with one update to this object, switch all paths to a backup path if the next-hop goes down. The objective of the present disclosure is the fast convergence when one of the ECMP paths (i.e., a next-hop) goes down. This is accomplished using ECMP, followed by a binary Active/Standby (A/S) protection. Specifically, a Shared Protection Group (SPG) object is used in hardware The following acronyms are used herein

| A/A | Active/Active redundancy |
| A/S | Active/Standby redundancy |
| AC | Attachment Circuit |
| BD | Bridge Domain |
| BGP | Border Gateway Protocol |
| DHD | Dual Home Device |

-continued

| ECMP | Equal Cost Multiple Path |
| ESI | Ethernet Segment Identifier, associated with a local/remote Ethernet port, Ethernet Segment (logical port) |
| EVPN | Ethernet Virtual Private Network |
| FEC | Forwarding Equivalent Class |
| FD | Forwarding Domain |
| FP | Flow point (which can be an AC) |
| FXC | Flexible Cross Connect |
| LP | Logical port (which can be associated with an Ethernet |
| MHD | Multi Home Device |
| NVID | Normalized VLAN Identifier |
| PE | Provider Edge router |
| SPG | Shared Protection Group |
| VLAN | Virtual Local Area Network |
| VPLS | Virtual Private Local area network Service |
| VPWS | Virtual Private Wire Service |
| VRF | Virtual Routing and Forwarding |

Figure 1:
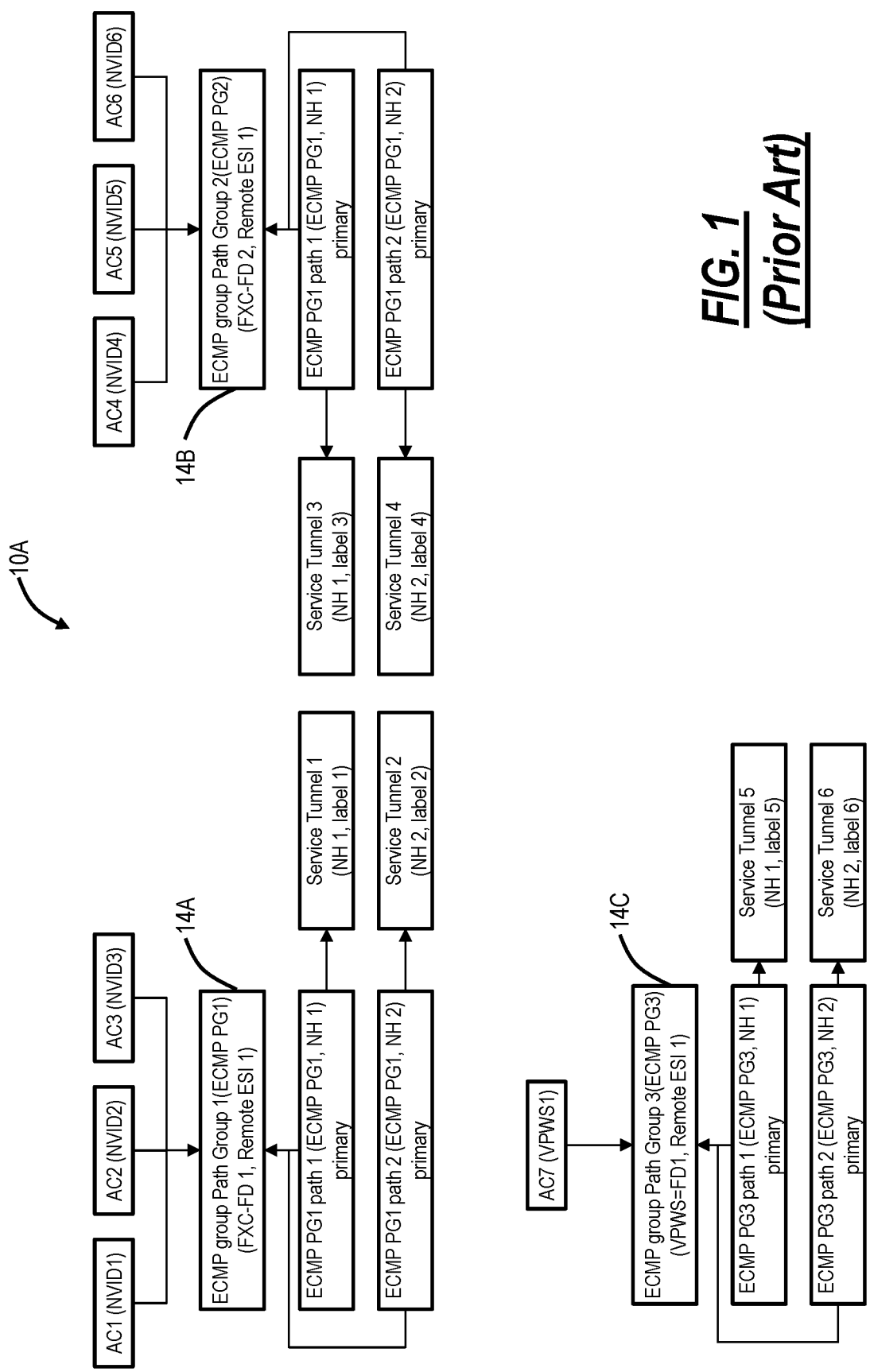
FIG. 1 is a logical diagram of a conventional object model for managing ECMPs in an EVPN which exhibits slow convergence when an ECMP fails.
Figure 2:
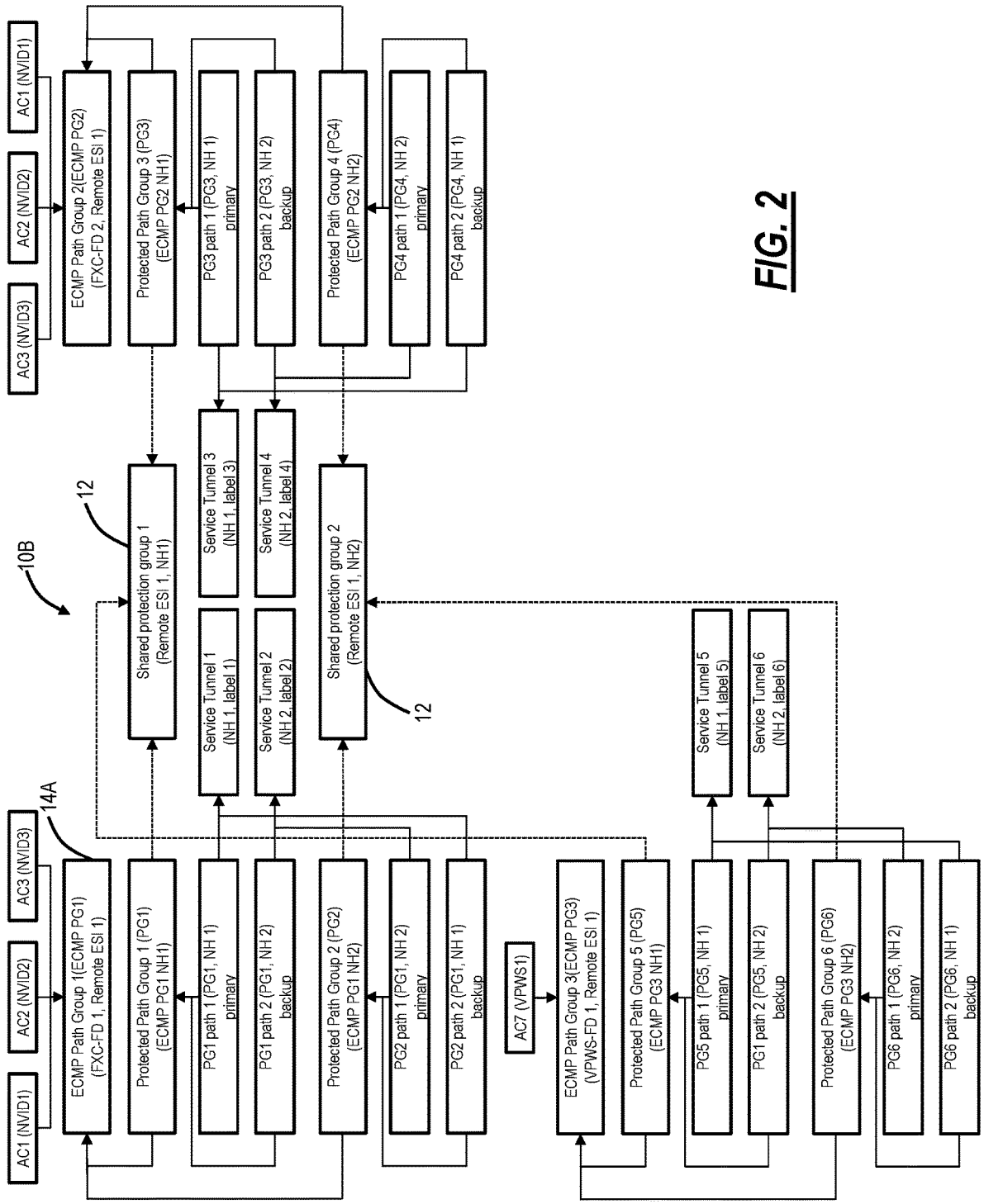
FIG. 2 is a logical diagram of an object model in accordance with the systems and methods described herein for managing ECMPs in an EVPN with faster convergence using Shared Protection Group (SPG) objects.

FIG. 1 is a logical diagram of a conventional object model 10A for managing ECMPs in an EVPN, which exhibits slow convergence when an ECMP fails. FIG. 2 is a logical diagram of an object model 10B in accordance with the systems and methods described herein for managing ECMPs in an EVPN with faster convergence using Shared Protection Group (SPG) objects 12. The object model 10A, 10B is a representation of logic that may include a combination of hardware, software, firmware, etc. to manage forwarding via ECMPs in an EVPN. The logic may be embodied in a System on a Chip (SoC), Application Specific Integrated Circuit (ASIC), Network Processing Unit (NPU), Field Programmable Gate Array (FPGA), or the like. The logic may be incorporated in a network device, network element, etc. that facilitates forwarding packets in an EVPN.

In the example of FIGS. 1 and 2, for illustration purposes, there are six ACs, labeled AC1-AC6 with NVID1-NVID6, respectively. There is also a seventh AC7 for a VPWS1 service. The AC1, AC2, AC3 are in an ECMP group object 14A, labeled ECMP group Path Group 1 (ECMP PG1). The AC4, AC5, AC6 are in an ECMP group object 14B, labeled ECMP group Path Group 2 (ECMP PG2). The AC7 is in an ECMP group object 14C, labeled ECMP group Path Group 3 (ECMP PG3). The ECMP group object 14 points to an array of paths, and each path corresponds to a specific path where a packet can be forwarded.

In the example of FIG. 1, the ECMP group object 14A is labeled FXC-FD 1, Remote ESI 1. The ECMP group object 14A points to a path 1, labeled ECMP PG1 path 1, that points to a Service Tunnel 1 (labeled NH 1, label 1), and to a path 2, labeled ECMP PG1 path 2, that points to a Service Tunnel 2 (labeled NH 2, label 2). Note, an actual implementation may include many more paths; FIG. 1 is a simplified example for ease of illustration. In FIG. 1, in the conventional implementation, in an Active/Active configuration, when a remote ESI, NH goes down, all ECMP path group objects 14 have to be manipulated to remove the down path. For example, in FIG. 1, if the NH 1 goes down, the ECMP group object 14A must be manipulated to remove it therein.

Note, the down path (NH) can be in one or more ECMP path group objects 14. In a practical implementation, on remote link or node failure, all ECMP paths associated with the NH link will be walked and removed, leading to much longer convergence time. For example, if there are one thousand AC(s) with 1000 ECMP(s) in the object model 10A, all 1000 ECMP objects need to be walked for deleting the NH path object associated with the down NH link. That is, in FIG. 1, the object model 10A only utilizes ECMP for NH management, and each failure requires manipulation of all impacted objects. Stated differently, if the Remote ESI (port) goes down on an NH (e.g., NH1), all the ECMP path groups that are created against that Remote ESI (ECMP PG1, ECMP PG2 and ECMP PG3 in FIG. 1), have to be manipulated to remove the path pointing to the NH1 service tunnel. There can be thousands of services (FDs), especially in the VPWS use case.

FIG. 2 illustrates the use of the SPG objects 12 to facilitate fast convergence. The SPG object 12 acts similar to a binary switch (i.e., on and off, 1 and 0, etc.). In the present disclosure, this SPG object 12 is used to point to two NHs, one active and one standby. The SPG object 12 is used such that when an NH goes down, all of the SPG objects 12 pointing to it as an active switch to the other NH.

Here, in FIG. 2, the ECMP group object 14A now includes two Protected Path Groups PG1, PG2. The PG1 is controlled by an SPG 1 object 12 to select NH1 or NH2. The PG2 is controlled by an SPG 2 object 12 to select NH2 or NH1. In the PG1, the NH1 is primary, and the NH2 is backup, and, in the PG2, the NH2 is primary, and the NH1 is backup.

Figure 3:
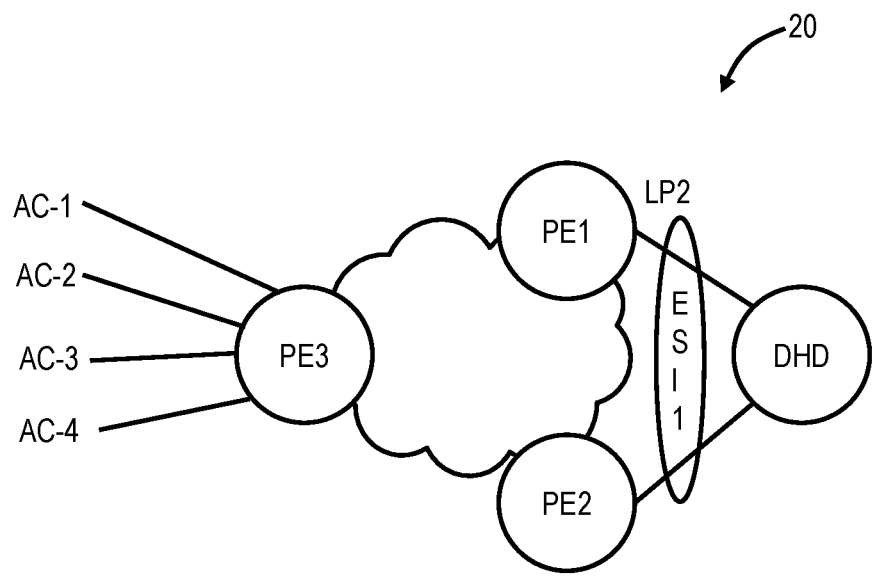
FIGS. 3 and 4 are network diagrams of a network illustrating fast convergence using the object model for Active/Active (A/A) redundancy.
Figure 4:
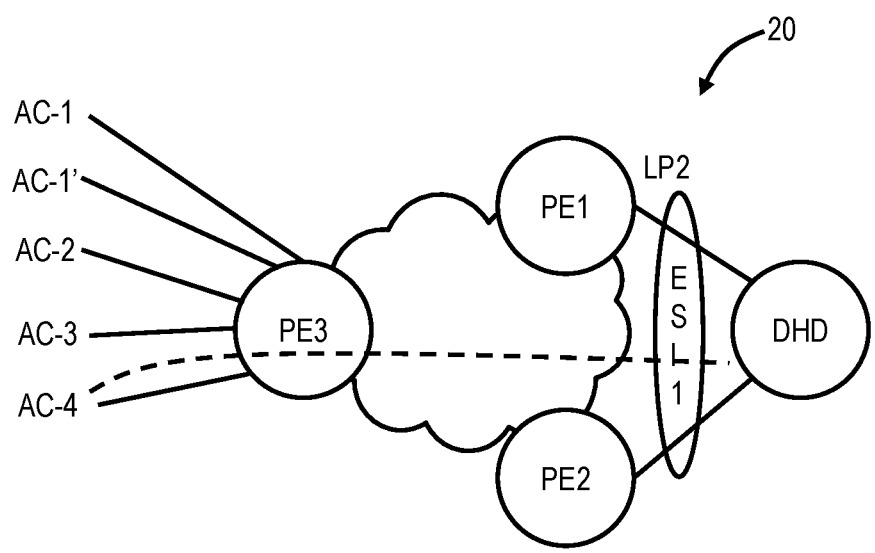
Figure 5:
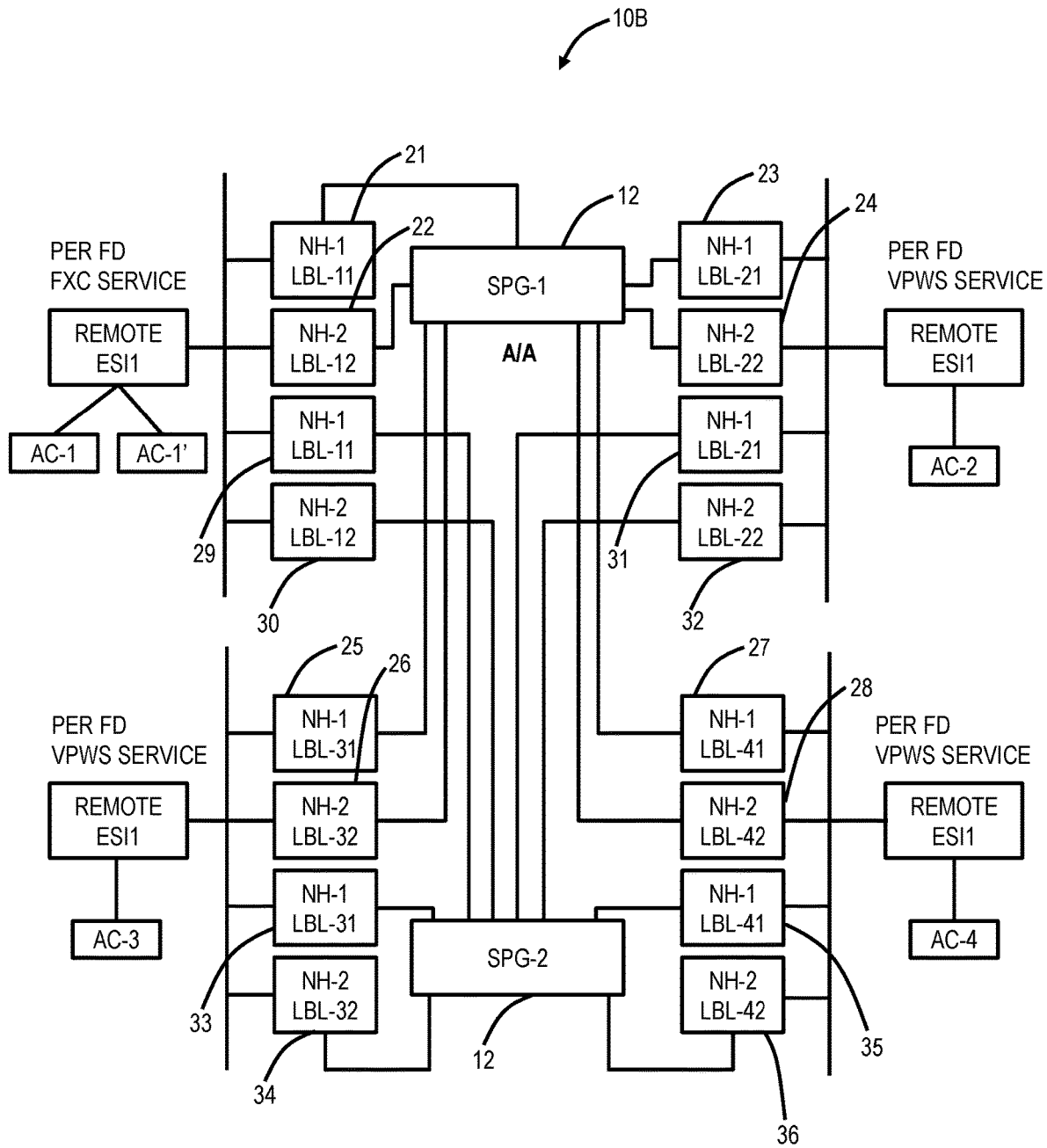
FIG. 5 is a logical diagram of the object model for a Provider Edge (PE3) in the network of FIGS. 3 and 4.

The use of the SPG object 12 for fast convergence is described as follows with reference to example network configurations and associated object maps. FIGS. 3 and 4 are network diagrams of a network 20 illustrating fast convergence using the object model 10B for Active/Active (A/A) redundancy. FIG. 5 is a logical diagram of the object model 10B for a Provider Edge (PE3) in the network 20. Specifically, in this example network 20, there are three PEs, labeled PE1, PE2, PE3. The PEs PE1, PE2 connect to a DHD via an ESI1. The PE3 has four ACs in FIG. 3, labeled AC-1, AC-2, AC-3, AC-4, and five ACs in FIG. 4, labeled AC-1, AC-1', AC-2, AC-3, AC-4. The dotted line in FIG. 4 represents end-to-end connectivity between the AC-4 and another AC (not shown) on the DHD. Those skilled in the art will recognize the PE1, PE2, PE3, and DHD are network elements or network devices that in physical implementation include the switching circuitry described herein that makes use of the object model 10B with the SPG objects 12 and the ECMP path group objects 14.

As described herein, a path group stands for an ECMP of paths, e.g., from PE3 perspective in FIG. 5 those are the tunnels to PE1 and PE2 that are associated with the services (those could be L2 VLANs or MAC addresses, for example) on PE1-DHD and PE2-DHD. FIG. 5 shows (logical view of) only one L2 forwarding table with L2 forwarding entries pointing to the ECMP of tunnels to the remote PEs (PE1 and PE2).

The objective here is to use the path group objects 14 and the SPG objects 12 to achieve per remote/local link down fast convergence and per remote node down fast convergence. FIG. 5 includes the object model 10B for switching configurations at the PE3 in FIG. 4. In this example, the remote ESI 1 is towards the DHD. There is a per FD FXC service with the AC-1, AC-1' to the remote ESI 1, and there are per FD VPWS services with the AC-2, AC-3, AC-4 with the remote ESI 1. In this simplified example, there are two SPG objects 12, labeled SPG-1, SPG-2, and there are two ECMPs (or NH), labeled NH-1, NH-2. The SPG-1, SPG-2 are used to select between the NH-1, NH-2 for each of the AC-1, AC-1', AC-2, AC-3, AC-4. Note, also, each AC-1, AC-1', AC-2, AC-3, AC-4 has different labels (LBL) assigned, labeled LBL-11, LBL-12, LBL-21, etc.

In the object model 10B, protection SPG object 12 per remote NH and Remote ESI will be pointed at by all paths learned from this NH, paths learned from another NH can be programmed as a backup for this protected NH. So, in the two NH (NH-1, NH-2) A/A ECMP case in FIG. 5 (e.g., the NH-1 can be from the PE3 to the PE1, and the NH-2 can be from the PE3 to the PE2), there are multiple ECMP path groups 14 possible per AC, with each path group having two paths one to NH-1, label x, and one to NH-2 label y, where x and y will be different for each path group. If in the data path, the path group object 14 is programmed as having four paths instead of two (i.e., w/ double the number of actual paths), now the paths can look as follows: NH-1, label x, NH-2, label y, NH-1 label x and NH-2 label y. Now, make the first two paths NH-1 label x and NH-2 label y point to the SPG01 that will be active for NH-1 and make the last two paths point to the SPG-2 that will be active for NH-2. A forwarded packet will still be forwarded over the NH-1 and NH-2 ECMP paths, however, for example, on an NH-1 remote link failure, the SPG-1 associated with the NH-1 remote link will be flipped, and now the NH-2 path will be used instead. The packet will be forwarded over the ECMP paths that now belong to only NH-2.

Note that the SPG object 12 is only one entry that needs to be updated in forwarding, but the result of updating it will lead to all paths learned from that remote NH over the remote port to be switched. Again, SPG stands for Shared Protection Group, which is a construct acting as a binary switch (i.e., on and off), in these examples, there are two SPGs—SPG-1, SPG-2, one for NH-1 (which is the NH for PE1) and one for NH-2 (which is the NH for PE2). Connected to the SPG-1 are the sets of two tunnels (to NH-1 and NH-2) by all ECMPs (objects 21, 22, 23, 24, 25, 26, 27, 28), the other set of two tunnels will be connected to the SPG-2 (objects 29, 30, 31, 32, 33, 34, 35, 36). The SPG-1 will have the bit unset to only use the tunnels to NH-1, i.e., NH-1 is set as primary and active, and the SPG-2 will have the bit set to only use tunnels to NH-2, i.e., NH-2 is set as primary and active, this way on an NH-1 failure, the SPG-1 can be toggled and then all traffic will go to NH-2. So, the four ECMPs in FIG. 5 each provide traffic to all four tunnels paths, and the two SPGs, SPG-1, SPG-2 will make the paths only two by selecting only one. That is, normal ECMP selects one of four tunnels, but the SPG setting makes the four tunnels only two tunnels. For Active/Active with fast convergence, when the Remote ESI, NH goes down, only the SPG object 12 has to be manipulated to remove the down path from the ECMP path group objects 14.

Back in FIG. 2, with more detail of the object model 10B, assume Remote ESI 1 is UP on both NH-1 and NH-2, and now assume the Remote ESI 1 goes down on NH-1. The data plane will manipulate the value of the SPG-1, e.g., flip the protection pointer value (from 0 to 1). This one-bit flip will cause Protected Path Group PG1, PG3, and PG5 to all switch to the NH-2 path (as they are all pointing to the SPG-1 [which determines which one of the two paths is active]). As such the ECMP groups (ECMP PG1, ECMP GP2, and ECMP PG3) will now do load balancing among two NH2 paths effectively taking the NH1 path out of the load balancing (for example in the case of ECMP PG1, protected path group PG1-Path2 and protected path PG2-Path1 will be load-balanced).

Again, FIG. 2 and the subsequent FIGS. are described with respect to two paths, NH1, NH2, but those skilled in the art will recognize the SPG can be used with more than two paths, e.g., NH1, NH2, . . . , NHn, where n>2). The number of SPG objects 12 equals the number of next-hops, and this approach also support more than two next-hops. For example, for three NHs, NH1, NH2, NH3, there would be three SPG objects, i.e., SPG1, SPG2, SPG3. These can be configured with NH1+NH2 to the SPG1, NH2+NH3 to the SPG2, and NH3+NH1 to the SPG3. Those skilled in the art will recognize this can be expanded for as many next-hops as needed. Also, this approach here and in the various illustrations utilizes a subsequent next-hop to be the backup (in an active/standby configuration) or another active (in an active/active configuration), i.e., NH2 is the backup for NH1 in the SPG1, etc. This sequential approach is just one implementation; other embodiments are also possible, e.g., NH1+NH3 to the SPG1, NH2+NH1 to the SPG2, etc. The key is to have one next-hop backup another next-hop that is active with the SPG object 12 such that, on failure, convergence simply requires modifying the SPG object 12.

Another key aspect of the approach described herein is that the number of SPG objects 12 is based on the number of next-hops, not the number of services. Multiple services can use the same SPG object 12. In fact, in a practical implementation, thousands (even millions) services can point to the same SPG object 12. Thus, in this approach, scaling of the SPG objects 12 is based on the next-hops, not the services, and convergence on failure for all services is achieved through the SPG object 12.

Figure 6:
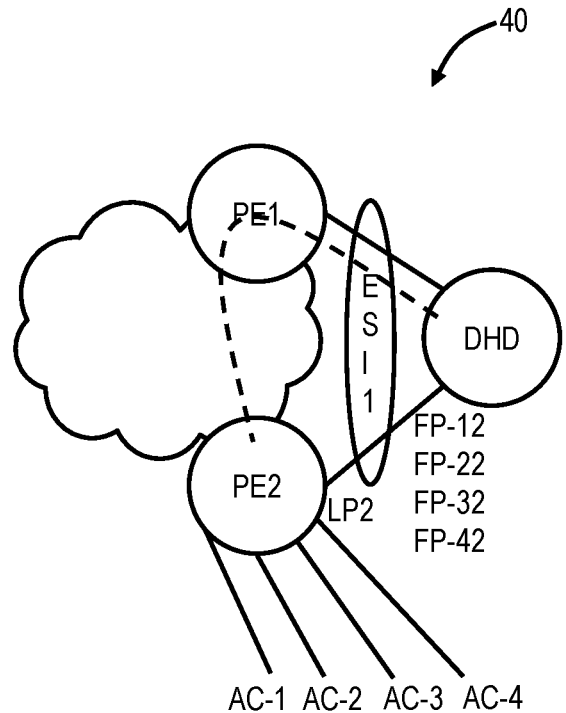
FIG. 6 is a network diagram of a network illustrating fast convergence using the object model for Active/Active (A/A) redundancy with local switching.
Figure 7:
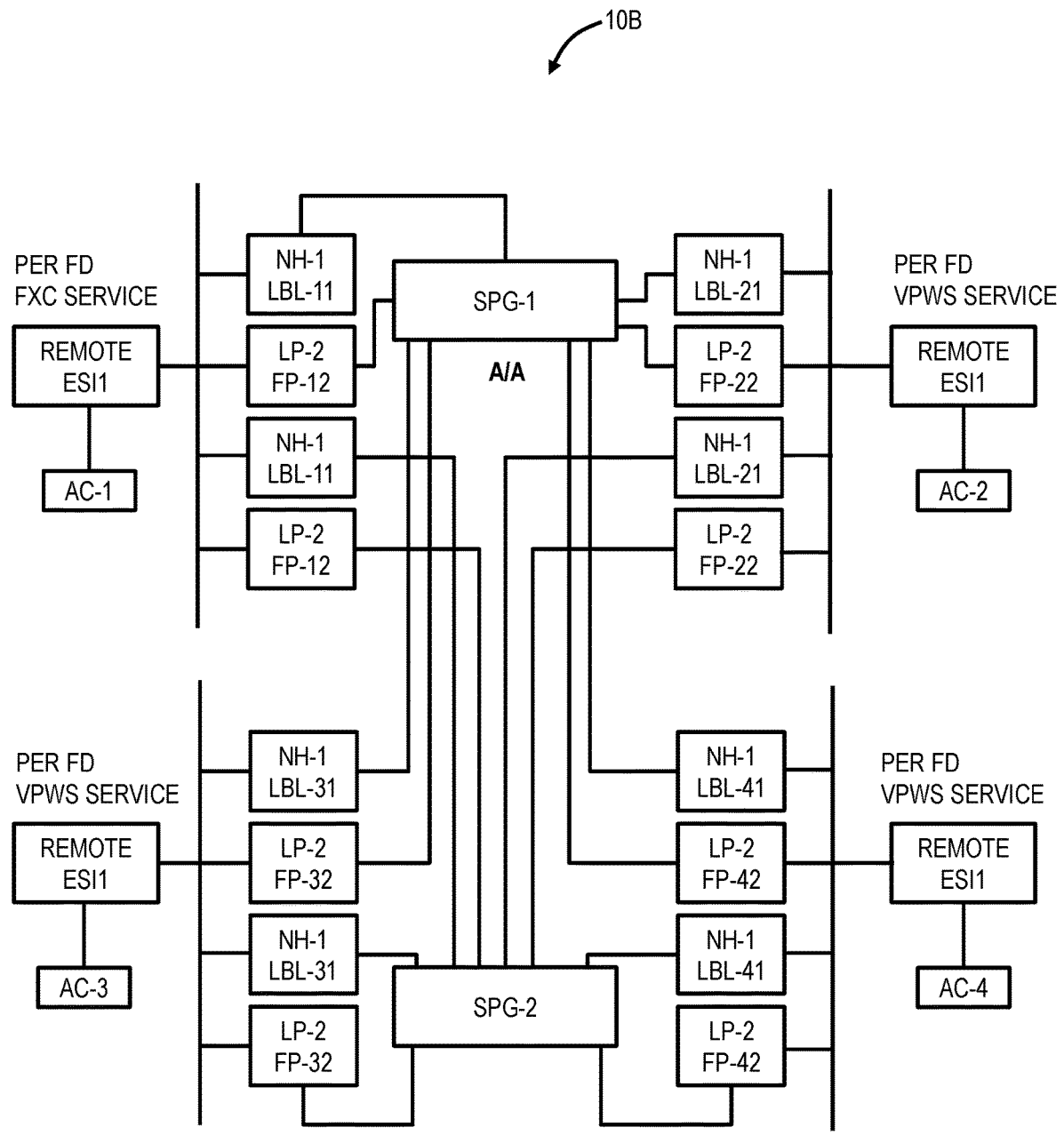
FIG. 7 is a logical diagram of the object model for a Provider Edge (PE2) in the network of FIG. 6.

FIG. 6 is a network diagram of a network 40 illustrating fast convergence using the object model 10B for Active/Active (A/A) redundancy with local switching. FIG. 7 is a logical diagram of the object model 10B for a Provider Edge (PE2) in the network 40. In the network 40, there is local switching of ACs AC-1, AC-2, AC-3, AC-4 connected to the PE2 such that these ACs can go to the DHD from the PE2 or from the PE1. The object model 10B in FIG. 7 is similar to the object model 10B in FIG. 5, with the object model 10B in FIG. 7 illustrating the forwarding chains on the PE2. For example, on PE2, in FIG. 7, for the AC-1, an FP will local switch to FP-12 if LP2 on the PE2 is up, and will use the MPLS tunnel between PE1 and PE2 when the LP2 is down, it can also do ECMP as well to both FP-12 and to the tunnel to PE1 when LP2 is up. Note, the object model 10B in FIG. 7 has ECMPs in the path groups for NH-1, and FPs for LP2.

Figure 8:
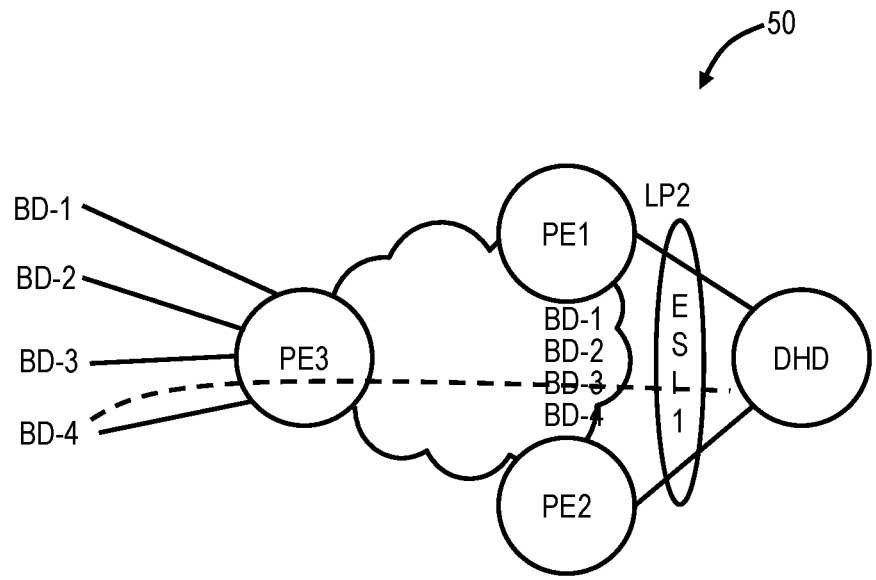
FIG. 8 is a network diagram of a network illustrating fast convergence using the object model for Active/Active (A/A) redundancy with VPLS.
Figure 9:
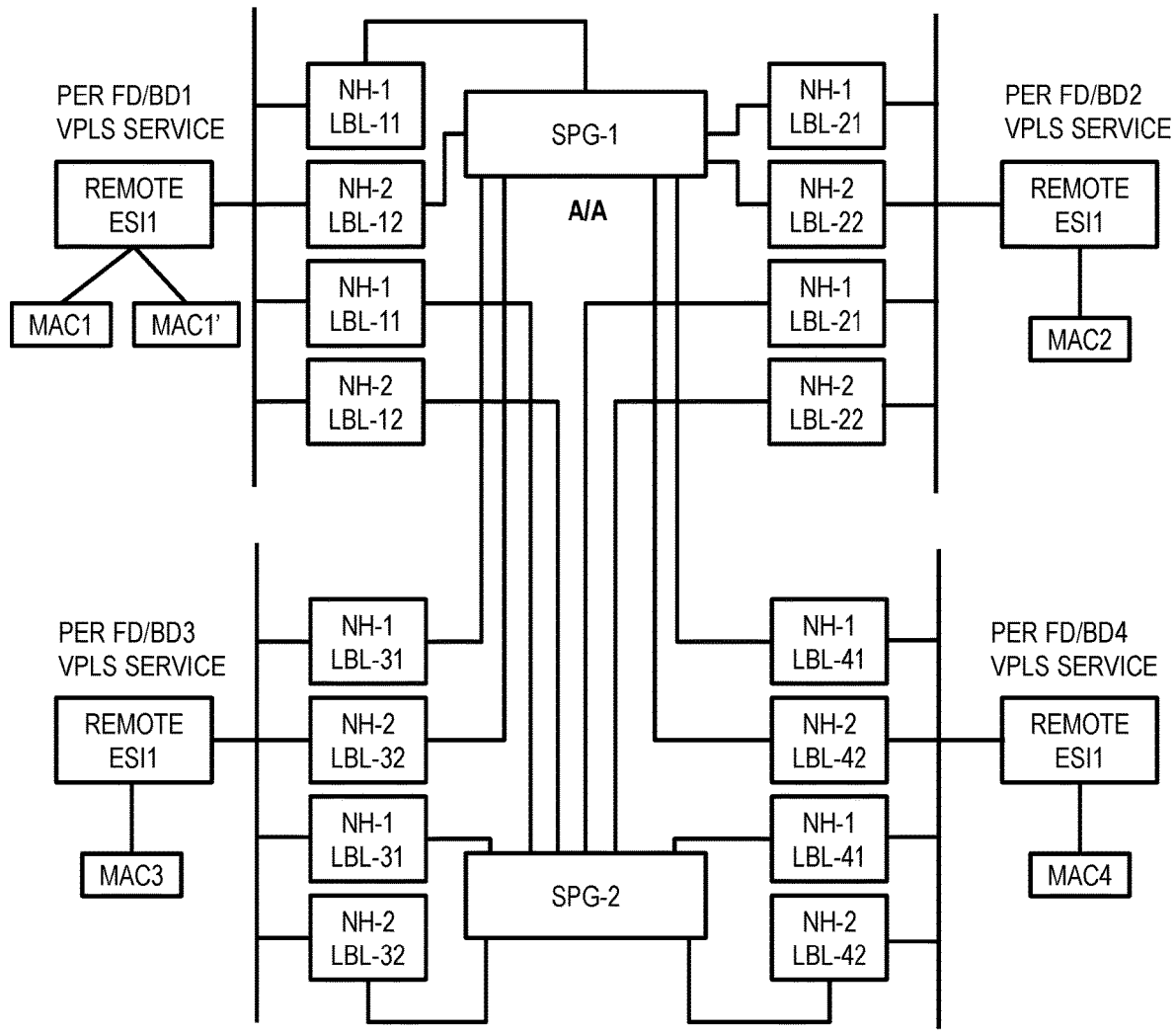
FIG. 9 is a logical diagram of the object model for a Provider Edge (PE3) in the network of FIG. 8.

FIG. 8 is a network diagram of a network 50 illustrating fast convergence using the object model 10B for Active/Active (A/A) redundancy with VPLS. FIG. 9 is a logical diagram of the object model 10B for a Provider Edge (PE3) in the network 50. Here, the network 50 is similar to the network 20 with BD-1, BD-2, BD-3, BD-4 connected to the PE-3, and A/A to the Remote ESI 1 to the DHD. In the object model 10B in FIG. 9, the AC are replaced with MAC1, MAC1', MAC2, MAC3, MAC4, and the functionality with the SPG is as described herein.

Figure 10:
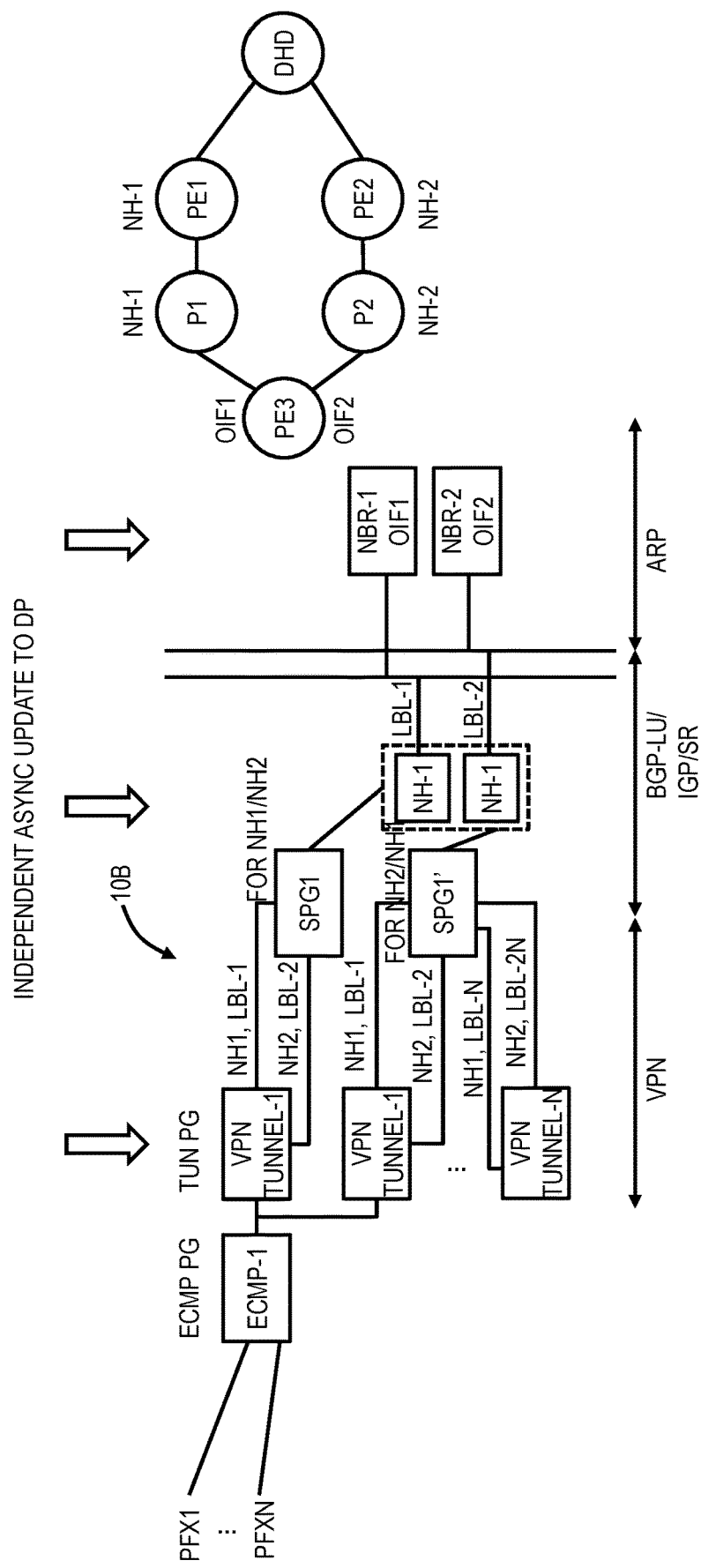
FIG. 10 is a network diagram and a logical diagram of an object model for a Layer 3 example using the SPG object.

FIG. 10 is a network diagram and a logical diagram of an object model 10B for a Layer 3 example using the SPG object 12. Here, there is one level ECMP path group per VRF route. For example, the packets can be distributed in Virtual Private Network (VPN) tunnels (VPN Tunnel-1 to Tunnel-N) at Layer 3, where the SPG objects 12 are used to select the VPN tunnels.

Figure 11:
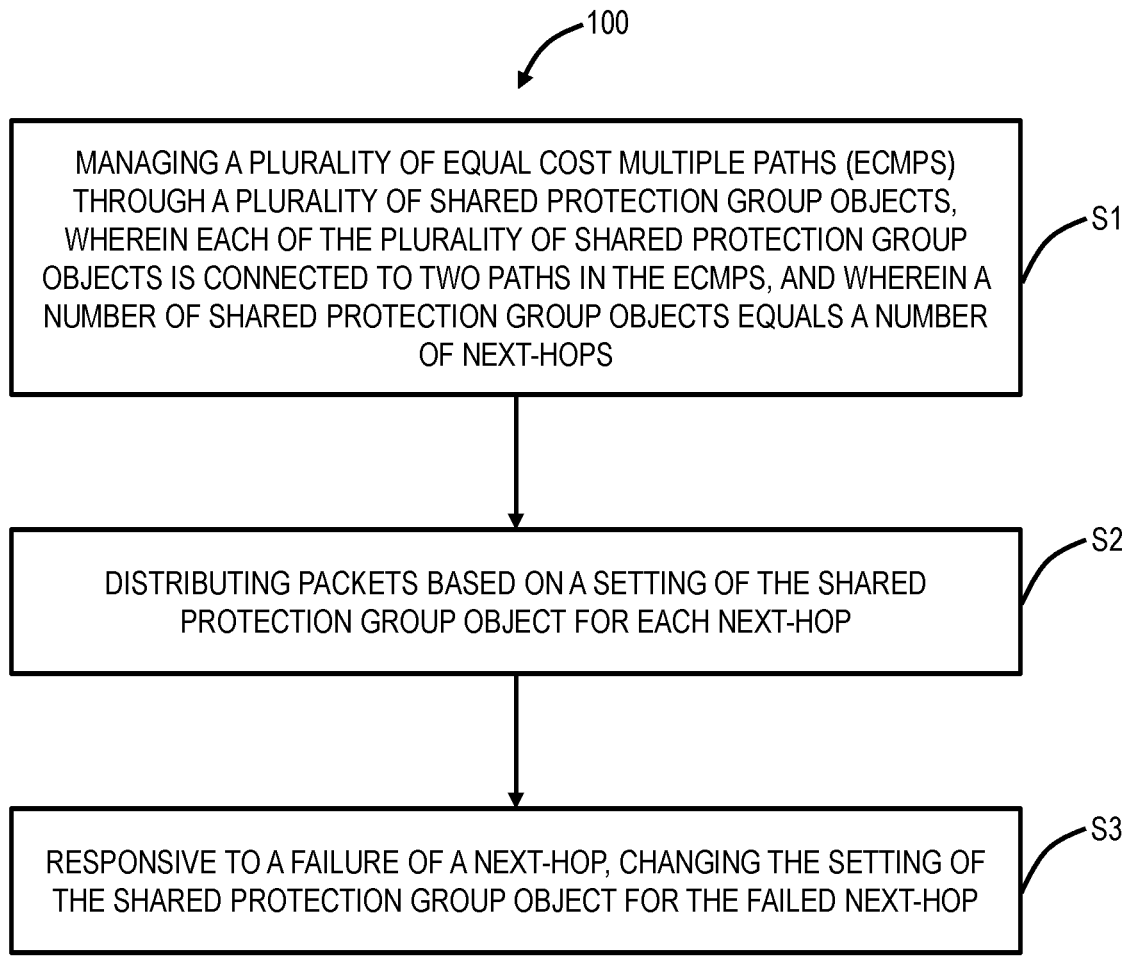
FIG. 11 is a flowchart of a process for ECMP fast convergence on path failure using objects in a switching circuit.

FIG. 11 is a flowchart of a process 100 for ECMP fast convergence on path failure using objects in a switching circuit. The process 100 contemplates operation in a switching circuit, such as at the PE2, PE3, etc., as a method, and as instructions in a non-transitory computer-readable medium for programming a device.

The process 100 includes managing a plurality of Equal Cost Multiple Paths (ECMPs) through a plurality of shared protection group objects, wherein each of the plurality of shared protection group objects is connected to two paths in the ECMPs, and wherein a number of shared protection group objects equals a number of next-hops (step S1); distributing packets based on a setting of the shared protection group object for each next-hop (step S2); and, responsive to a failure of a next-hop, changing the setting of the shared protection group object for the failed next-hop (step S3).

A number of the plurality of ECMPs is double a number of actual paths, and where the shared protection group object for each next-hop is used for designating one path as active and one path as standby such that the distributing is to the number of actual paths. The convergence for the failed next-hop is based on a pre-selected backup next-hop based on the shared protection group object for the failed next-hop.

The packets can be distributed in an Active/Active configuration from a Provider Edge (PE) to a Dual Home Device, as in FIG. 5. The packets can be distributed in via Virtual Private Wire Service (VPWS) local switching by where one of the ECMPs is reachable via a local port, as in FIG. 7. The packets can be distributed in a Virtual Private Wire Service (VPWS). The packets can be distributed in a Virtual Private Local area network Service (VPLS), as in FIG. 9.

Also, for a specific shared protection group object, a plurality of different services utilize the specific shared protection group object for associated next-hops. In fact, there can be hundreds, thousands, etc. services and each can use the SPG objects 12 based on the associated next-hops.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A switching circuit comprising:
   circuitry configured to
   manage a plurality of Equal Cost Multiple Paths (ECMPs) through a plurality of shared protection group objects, wherein each of the plurality of shared protection group objects is connected to two paths in the ECMPs, and wherein a number of shared protection group objects equals a number of next-hops,
   cause distribution of packets based on a setting of a single bit in hardware that represents the shared protection group object for each next-hop, and
   responsive to a failure of a next-hop, change the setting of the single bit in hardware for the shared protection group object for the failed next-hop, for fast convergence such that the setting with one update changes all forwarding paths associated with the next-hop because the hardware is located in the forwarding path.

2. The switching circuit of claim 1, wherein a number of the plurality of ECMPs is double a number of actual paths, and where the shared protection group object for each next-hop is used for designating one path as active and one path as standby such that the distributing is to the number of actual paths.

3. The switching circuit of claim 1, wherein convergence for the failed next-hop is based on a pre-selected backup next-hop based on the shared protection group object for the failed next-hop.

4. The switching circuit of claim 1, wherein the packets are distributed in an Active/Active configuration from a Provider Edge (PE) to a Dual Home Device.

5. The switching circuit of claim 1, wherein the packets are distributed in via Virtual Private Wire Service (VPWS) local switching where one of the ECMPs is reachable via a local port.

6. The switching circuit of claim 1, wherein the packets are distributed in a Virtual Private Wire Service (VPWS).

7. The switching circuit of claim 1, wherein the packets are distributed in a Virtual Private Local area network Service (VPLS).

8. The switching circuit of claim 1, wherein the packets are distributed in Virtual Private Network (VPN) tunnels at Layer 3.

9. The switching circuit of claim 1, wherein, for a specific shared protection group object, a plurality of different services utilize the specific shared protection group object for associated next-hops.

10. A method comprising:
    managing a plurality of Equal Cost Multiple Paths (ECMPs) through a plurality of shared protection group objects, wherein each of the plurality of shared protection group objects is connected to two paths in the ECMPs, and wherein a number of shared protection group objects equals a number of next-hops;
    distributing packets based on a setting of a single bit in hardware that represents the shared protection group object for each next-hop; and
    responsive to a failure of a next-hop, changing the setting of the single bit in hardware for the shared protection group object for the failed next-hop, for fast convergence such that the setting with one update changes all forwarding paths associated with the next-hop because the hardware is located in the forwarding paths.

11. The method of claim 10, wherein a number of the plurality of ECMPs is double a number of actual paths, and where the shared protection group object for each next-hop is used for designating one path as active and one path as standby such that the distributing is to the number of actual paths.

12. The method of claim 10, wherein convergence for the failed next-hop is based on a pre-selected backup next-hop based on the shared protection group object for the failed next-hop.

13. The method of claim 10, wherein the packets are distributed in an Active/Active configuration from a Provider Edge (PE) to a Dual Home Device.

14. The method of claim 10, wherein the packets are distributed in via Virtual Private Wire Service (VPWS) local switching where one of the ECMPs is reachable via a local port.

15. The method of claim 10, wherein the packets are distributed in a Virtual Private Wire Service (VPWS).

16. The method of claim 10, wherein the packets are distributed in a Virtual Private Local area network Service (VPLS).

17. The method of claim 10, wherein the packets are distributed in Virtual Private Network (VPN) tunnels at Layer 3.

18. A non-transitory computer-readable medium having instructions stored thereon for programming a device to perform steps including:
    managing a plurality of Equal Cost Multiple Paths (ECMPs) through a plurality of shared protection group objects, wherein each of the plurality of shared protection group objects is connected to two paths in the ECMPs, and wherein a number of shared protection group objects equals a number of next-hops;
    distributing packets based on a setting of a single bit in hardware that represents the shared protection group object for each next-hop; and
    responsive to a failure of a next-hop, changing the setting of the single bit in hardware for the shared protection group object for the failed next-hop, for fast convergence such that the setting with one update changes all forwarding paths associated with the next-hop because the hardware is located in the forwarding paths.

19. The non-transitory computer-readable medium of claim 18, wherein a number of the plurality of ECMPs is double a number of actual paths, and where the shared protection group object for each next-hop is used for designating one path as active and one path as standby such that the distributing is to the number of actual paths.

20. The non-transitory computer-readable medium of claim 18, wherein convergence for the failed next-hop is based on a pre-selected backup next-hop based on the shared protection group object for the failed next-hop.

* * * * *